US006523242B2

(12) United States Patent
Armellini et al.

(10) Patent No.: US 6,523,242 B2
(45) Date of Patent: Feb. 25, 2003

(54) GUNNEL-RAIL INSERT INSTALLATION METHOD

(75) Inventors: Art Armellini, Cocoa, FL (US); Charles Cycholl, Springfield, IL (US)

(73) Assignee: Rubrail Tool, Inc., Springfield, IL (US)

( * ) Notice: Subject to any disclaimer, the term of this patent is extended or adjusted under 35 U.S.C. 154(b) by 0 days.

(21) Appl. No.: 09/976,541

(22) Filed: Oct. 12, 2001

(65) Prior Publication Data

US 2002/0029455 A1 Mar. 14, 2002

Related U.S. Application Data

(62) Division of application No. 09/482,406, filed on Jan. 12, 2000, now Pat. No. 6,341,410.

(51) Int. Cl.[7] .................................... B23P 21/00

(52) U.S. Cl. .................................... 29/451; 29/235

(58) Field of Search .................................... 29/235, 293.5, 29/293.58, 293.57, 238, 290, 451; 404/87, 74; 81/57.19

(56) References Cited

U.S. PATENT DOCUMENTS 3,065,724 A 11/1962 Tritt
3,473,836 A 10/1969 Halter
3,897,967 A 8/1975 Barenyi
4,084,533 A 4/1978 Boyer
4,292,913 A 10/1981 Siebert et al.
4,528,736 A * 7/1985 Hope et al. .................... 29/235
4,903,629 A 2/1990 Maudlin et al.
5,732,585 A 3/1998 Haushahn et al.
5,758,400 A 6/1998 Miller et al.

* cited by examiner

*Primary Examiner*—Robert C. Watson
(74) *Attorney, Agent, or Firm*—Brian S. Steinberger; Law Offices of Brian S. Steinberger, P.A.

(57) ABSTRACT

A handheld installation tool for installing and removing vinyl and plastic resilient bumper inserts into the channels of gunnel rails on the sides of boats, motorhomes, and the like, as well as on the sides of tables, walls and shelves. The gunnel rail insert or the rub rail insert is placed in the handheld tool and is mechanically advanced while the tool is placed about and abuts against the gunnel rail channel. The tool has a single elongated handle on one end. On the opposite end is a pair of wheels that is positioned to run about the sides of the gunnel rail channels with a rear portion of the wheels abutting against the channels at a tilted angle of approximately 30 degrees to the channel. After the tool passes over the gunnel rails/rub rails, portions of the insert material strip expand into inside lip portions of the gunnel rail/rub rails locking the strip material in place. The insert material can be removed from the gunnel rail/rub rail by prying up an edge of the insert material feeding it into the wheels of the tool and reversing the installation steps.

8 Claims, 11 Drawing Sheets

GUNNEL-RAIL INSERT INSTALLATION METHOD

This is a Divisional of application Ser. No. 09/482,406 filed Jan. 12, 2000, now U.S. Pat. No. 6,341,410.

This invention relates to gunnel rails on boats, motor homes and the like, and in particular to a tool which installs, locks and removes resilient and compressible bumper materials into the gunnel rail channels on the sides of boats, motor homes, and the like, and claims priority to U.S. Provisional Application Serial No. 60/116,165 filed Jan. 15, 1999.

BACKGROUND AND PRIOR ART

Gunnel rails and rub rails have been used over the years on boats to join hulls and decks together, where the gunnel rails have resilient materials inserted within their channels. See for example, U.S. Pat. No. 3,065,724 to Tritt; and U.S. Pat. No. 4,292,913 to Siebert et al. Other similar bumper assemblies have been proposed for vehicles, docks, and the like, that also use similar expandible resilient material inserts inside of channels. See for example, U.S. Pat. No. 3,473,836 to Halter.

A basic problem with these assemblies is an installer having to insert the resilient material into the gunnel rail channels. Typically, in the boating industry, an installer uses multiple tools such as screwdrivers, hammer, pliers, hand spade, putty knives, duck-bill pliers, and the like, to bang and push the resilient insert material into the channels. This current method is both time consuming and an expensive project in labor costs for the installation. These installation techniques cause scrapes, bumps, dents and tears in the insert material. Additionally, these installation tools damage the channels and surrounding surfaces on the boats and vehicles. Under these conventional types of installation, the insert material strips must be heated to soften the material for use. The strip materials are generally heated in hot boxes or within hot water tanks. After the strip material is heated, it is then installed with the tools described above. Problems occur from these heating techniques. The heating and subsequent cooling of the materials causes non-uniform shrinkage and inconsistent expansion throughout the strip material within the gunnel rail channels resulting in unsightly bulges and depressions. Furthermore, the installers have received injuries such as damaged hands and workmen's compensation claims through the installation process. The above problems become compounded when the resilient insert materials need to be removed and replaced over time due to natural wear and use.

U.S. Pat. No. 3,897,967 to Barenyi describes a "protective strip for motor vehicles . . . ", title that uses resilient bumpers with backings having expandible plug inserts that pass into recesses in the base walls of the channels. However, this reference requires multiple parts and extra tooling of parts that would not be a practical substitute for existing gunnel rails and rub rails on boats, vehicles, and the like.

Other techniques known for inserting resilient bumper strips into channels have included machines. See for example, U.S. Pat. No. 5,758,400 to Miller et al. However, this type of machine would not be a practical alternative for a single user that needs to install the resilient insert bumpers into gunnel rails and rub rails that are already located on the sides of boats, vehicles, and the like. Clearly, this machine would be both expensive in cost and is incapable of being used for already mounted gunnel rails and rub rails.

Other proposals have been made but also fail to overcome the problems described above. See for example, U.S. Pat. No. 4,084,533 to Boyer and U.S. Pat. No. 4,903,629 to Mauldin et al.

SUMMARY OF THE INVENTION

The first objective of the present invention is to provide a tool to allow a single person the capability of installing and removing resilient bumper insert materials into gunnel rail/rub rails on the side of boats, vehicles, and the like.

The second object of this invention is to provide an inexpensive technique of installing and removing resilient bumper insert materials into gunnel rails/rub rails already located on the sides of boats, vehicles, and the like.

The third object of this invention is to provide a technique of installing and removing resilient bumper insert materials inside of gunnel rails/rub rails that does not mark up, scrape, dent, nor destroy the resilient bumper insert material.

The fourth object of this invention is to provide a technique of installing and removing resilient bumper insert materials into gunnel rails/rub rails, without marking up, scraping, denting nor destroying the gunnel rails/rub rails.

The fifth object of this invention is to provide a technique of installing and removing resilient bumper insert materials into gunnel rails/rub rails, without injuring the installer.

A preferred embodiment of the invention includes a handheld tool for inserting resilient bumpers into the channels on gunnel rails and rub rails that are located on the sides of vehicles such as boats, motor homes and trailers. The handheld tool has a first end for a handgrip and a second end with a rotatable rollers and wheels, where the second end is laid over the front portion of the elongated resilient strip and causes the rear portion of the elongated strip to be inserted into the channels on the side of the vehicles. Each of the channels have a rear wall for being attached to the side of the vehicle, and inwardly bending lips for surrounding an opening to the channel, wherein the rear portion of the elongated resilient strip is inserted into the opening of the channel. The elongated resilient strips have a backwall forming the rear portion, the backwall having an upper edge and a lower edge, wherein the upper edge and the lower edge become compressed towards one another when being inserted within the channel and expand when the rollers of the handheld tool passes over the channel. The rotatable wheels and rollers on the second end of the handheld tool have dual rollers separated from one another, wherein the rear portion of the elongated resilient strip is compressed together by the strip passing through the dual rollers. Each of the dual rollers has an indentation groove running about the perimeters thereof. The second end of the tool further includes nut heads connected to gearwheels, wherein rotating the nut head rotates the gear wheels causing both dual rollers to rotate. A socket wrench can be used for fitting about the nut heads, wherein rotating the socket wrench rotates the wheels and causes strip material to be pulled through the wheels while simultaneously being compressed. The user simultaneously holds the tool against the channel openings of the gunnel rails and rub rails and slides the tool against the gunnel rails/rub rails at a tilt angle of approximately 30 degrees to the gunnel rails/rub rails, while rotating the socket wrench causing the strip material to be inserted into the channel openings. After the tool passes over a gunnel rail/rub rail section, portions of the strip material expand into the inside lip portions of the gunnel rail/rub rail locking the strip material in place.

The strip material can be removed by prying up an edge of the material from the channel of the gunnel rail/rub rail, and using the tool reversing the installation steps described above.

The gunnel rails/rub rails with resilient bumpers can be used with other objects such as but not limited to tables, shelves, walls, and the like.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
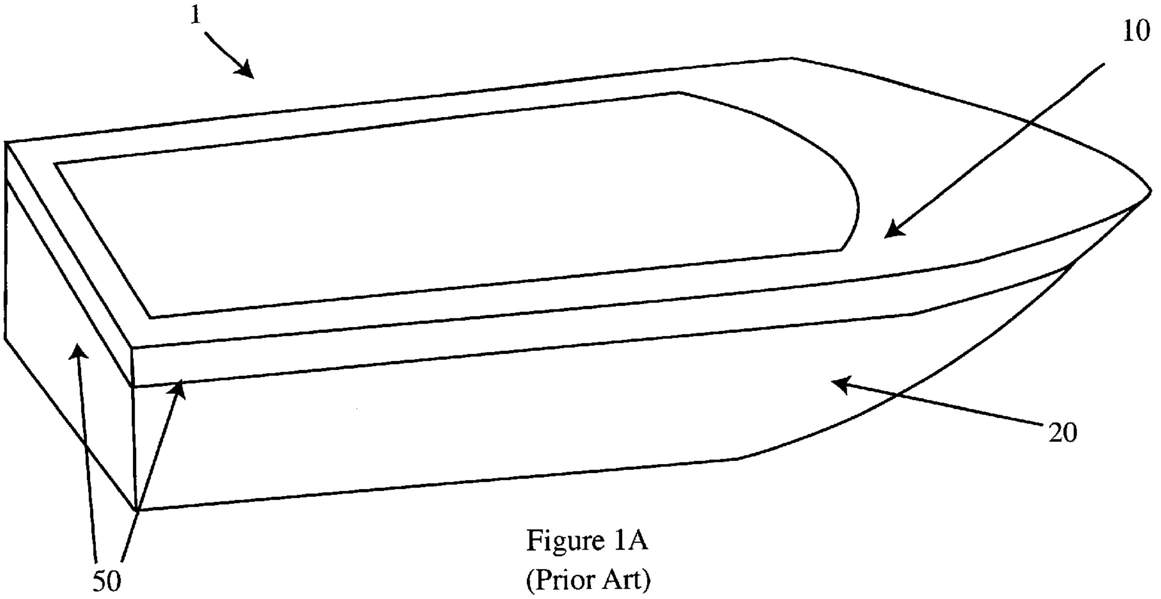
Figure 1A (Prior Art)
FIG. 1A is a perspective view of a prior art boat having a gunnel rails/rub rails.
Figure 1B:
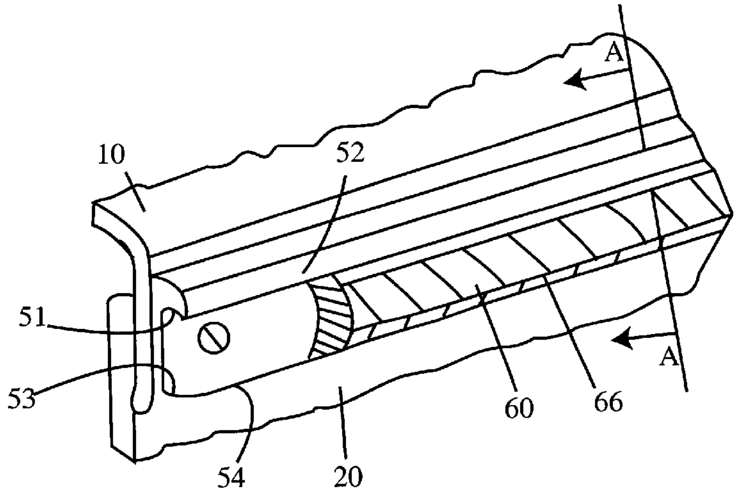
Figure 1B (Prior Art)
FIG. 1B is an enlarged view of a single gunnel rail/rub rail of FIG. 1A.
Figure 1C:
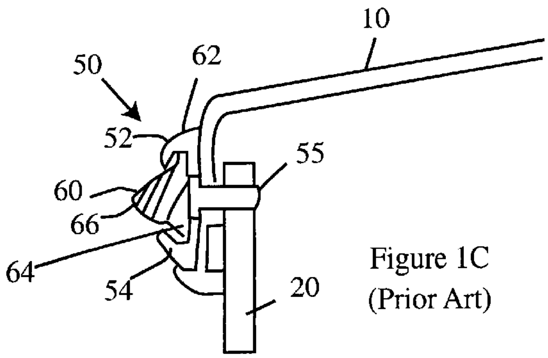
Figure 1C (Prior Art)
FIG. 1C is a side cross-sectional view of the gunnel/rail/rub rail of FIG. 1B along arrow A.

FIG. 1A is a perspective view of a prior art boat 1 having a gunnel rails/rub rails 50. The primary purpose of the gunnel rails/rub rails 50 has been to join the deck section 10 and hull portions 20 of a boat 1 together. See for example, U.S. Pat. No. 3,065,724 to Tritt, which is incorporated by reference. FIG. 1B is an enlarged view of a single gunnel rail/rub rail 50 of FIG. 1A. FIG. 1C is a side cross-sectional view of the gunnel/rail/rub rail 50 of FIG. 1B along arrow A. Referring to FIGS. 1A–1C, each gunnel rail/rub rail 50 has an upper inwardly bending lip portion 52 and a lower inwardly bending portion 54 that is connected to the deck 10 and hull 20 by fasteners 55. An elongated resilient bumper strip 60 has an upper backing edge portion 62, a lower backing edge portion 64 and an outwardly facing raised tip portion 66, where the upper and lower backing edges 62, 64 expand within the inner spaces 51, 53 formed by upper lip portion 52 and lower lip portion 54.

Figure 2A:
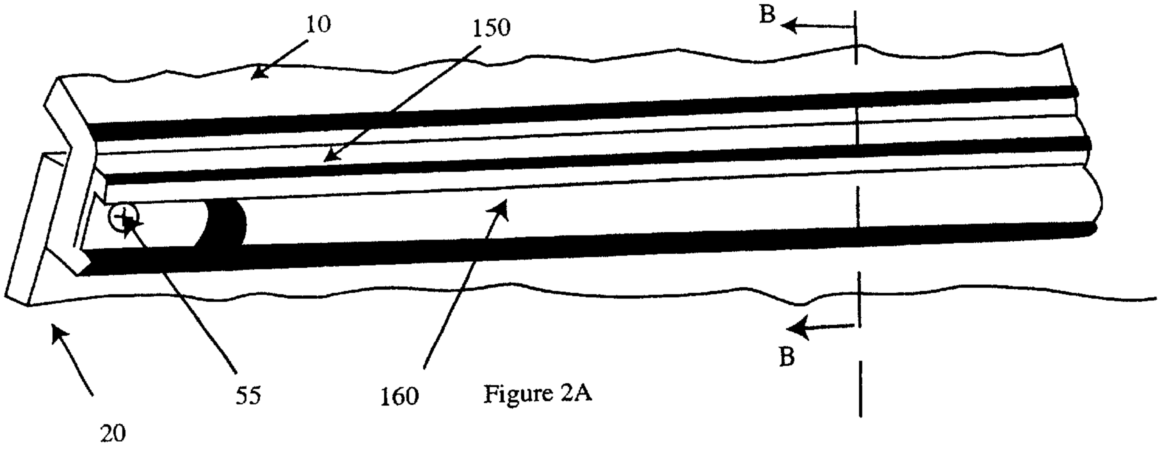
FIG. 2A is an enlarged view of a single gunnel rail/rub rail with insert for use with the subject invention.
Figure 2B:
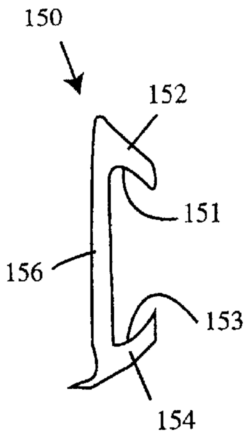
FIG. 2B is a side cross-sectional view of the gunnel rail/rub rail of FIG. 2A along arrow B.
Figure 2C:
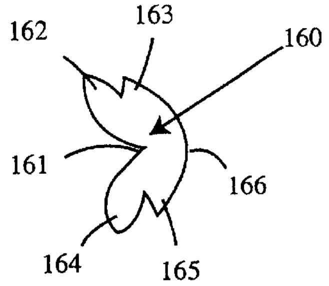
FIG. 2C is a side cross-sectional view of the insert for the gunnel rail/rub rail of FIG. 2A along arrow B.

FIG. 2A is an enlarged view of a single gunnel rail/rub rail 150 with insert 160 for use with the subject invention. FIG. 2B is a side cross-sectional view of the gunnel rail/rub rail 150 of FIG. 2A along arrow B. FIG. 2C is a side cross-sectional view of the insert 160 for the gunnel rail/rub rail 150 of FIG. 2A along arrow B. Referring to FIGS. 2A–2C, gunnel rail/rub rail 150 connects to deck 10 and hull 20 similar to that shown in FIGS. 1A–1C. Gunnel rail/rub rail 150 includes an inwardly bending upper lip portion 152 separated from rear wall 156 by a space 151, and an inwardly bending lower lip portion 154 separated from rear wall 156 by a space 153. Resilient bumper strip 160 includes an upper angled backing edge 162 and a lower angled backing edge 164 with an indentation groove 161 therebetween. Strip 160 further includes an upper raised front edge 163 and a lower raised front edge 165 with a raised face portion 166 therebetween.

Figure 3A:
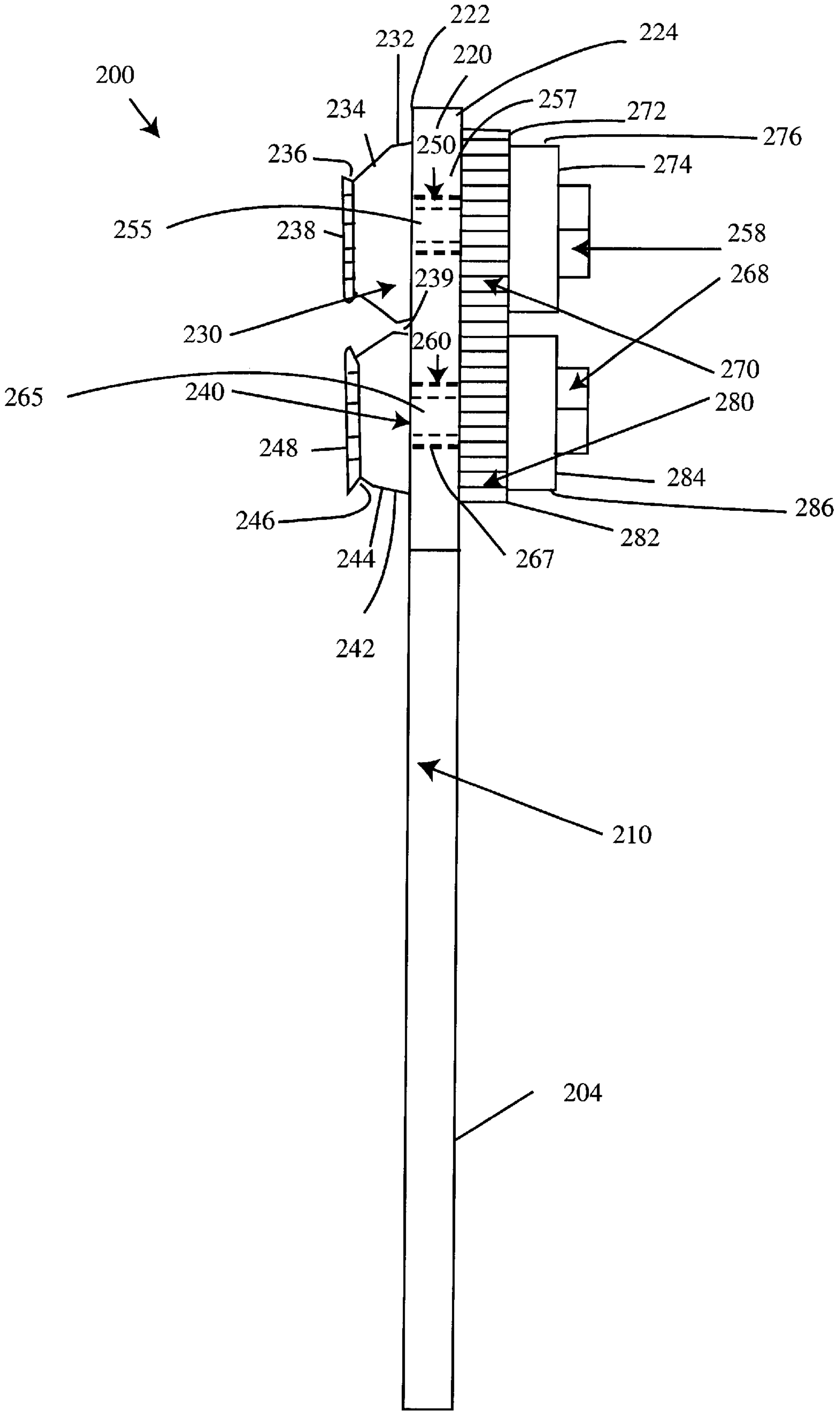
FIG. 3A is a side view of the novel handheld gunnel rail/rub rail insert tool invention.
Figure 3B:
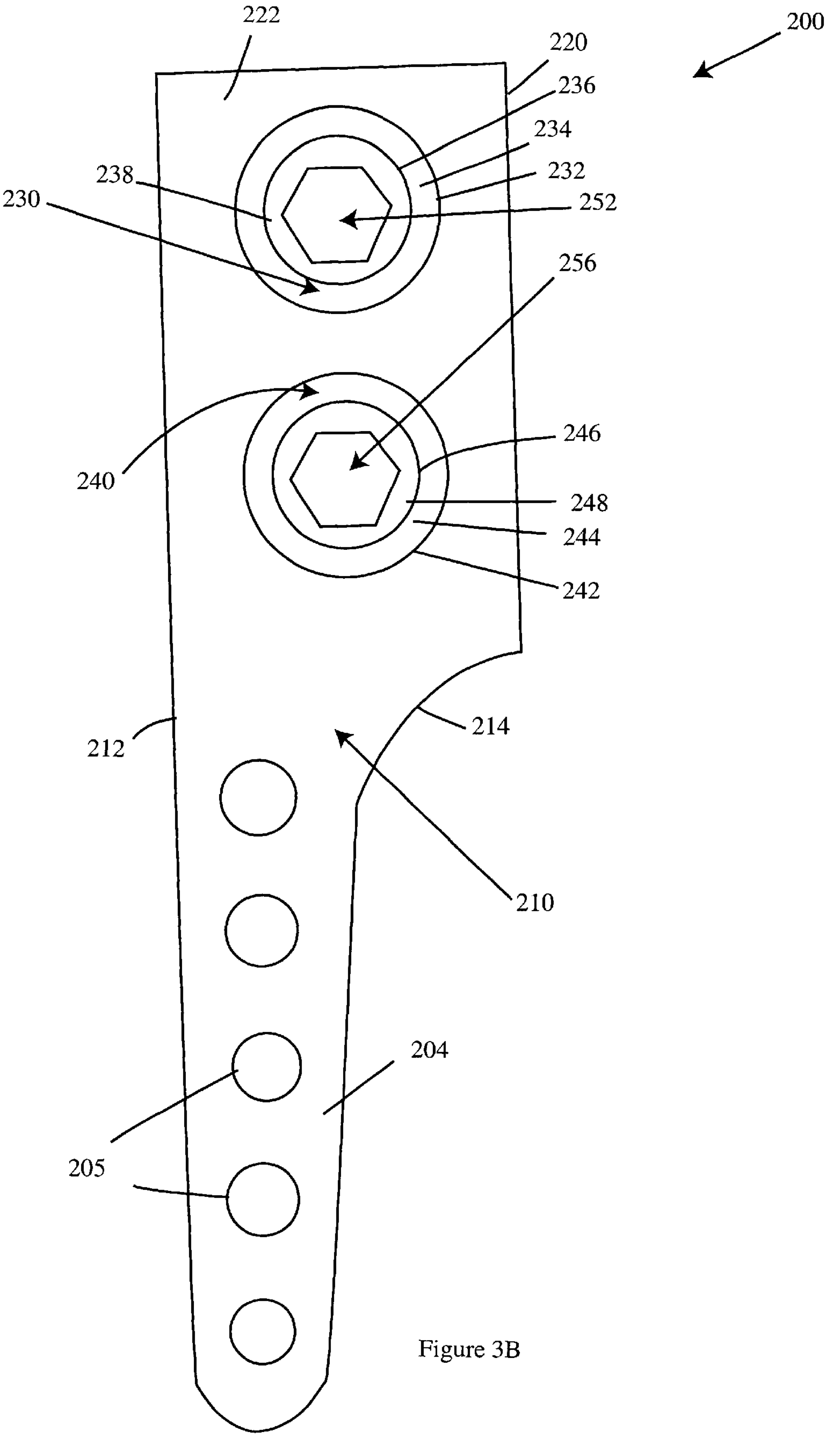
FIG. 3B is a rear view of the insert tool of FIG. 3A along arrow C1.
Figure 3C:
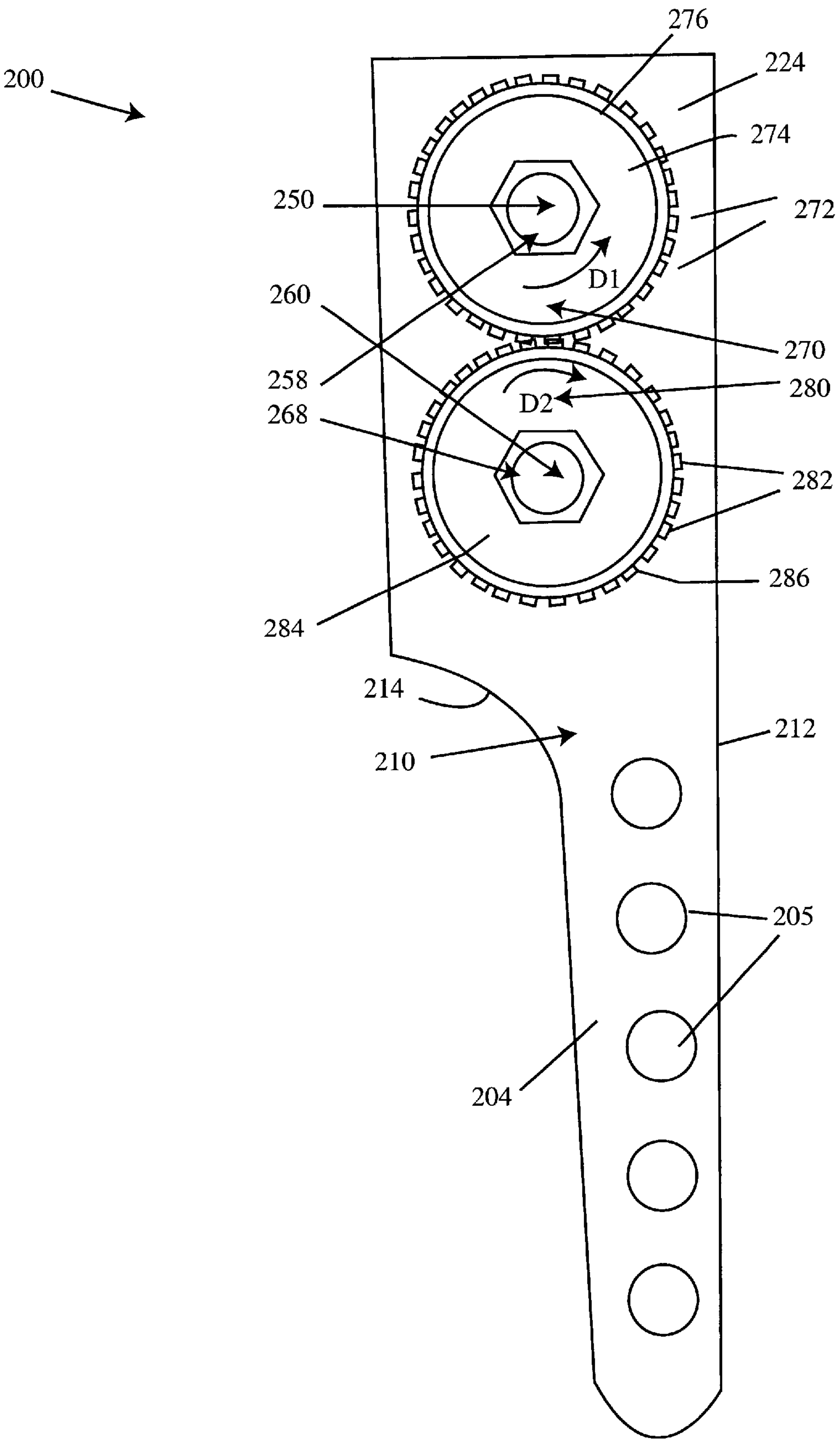
FIG. 3C is a front view of the insert tool of FIG. 3A along arrow C2.

FIG. 3A is a side view of the novel handheld gunnel rail/rub rail insert tool 200. FIG. 3B is a rear view of the insert tool 200 of FIG. 3A along arrow C1. FIG. 3C is a front view of the insert tool 200 of FIG. 3A along arrow C2. Tool 200 can be formed from metal such as aluminum, stainless steel, galvanized metal, ferrous and nonferrous metal, hardened plastic(such as but not limited to Delron®), and the like. Referring to FIGS. 3A–3C, tool 200 includes an elongated handle portion 204 having holes 205 therethrough, a midportion 210 with straight side 212 and opposite curved side 214, and an upper enlarged portion 220.

Referring to FIGS. 3A–3C, upper enlarged portion 220 with rear face side 222 has dual rotatable wheels 230, 240 vertically parallel to and stacked on top of one another and separated from one another by a space 239 therebetween. Each of the dual wheels 230, 240 includes an enlarged portion 232, 242, inwardly sloping side portions 234, 244, raised front lip knurled(serrated) edges 236, 246 and a flat face portion 238, 248. In the middle of flat face portions 238, 248 are the rear hexagon heads 252, 262 that are affixed to inner ends of pilot bolts 250, 260, the latter of which have a cylindrical mid-portions 255, 265 which pass through upper enlarged portion 220. Internal bearings 257, 267 can be used to allow cylindrical internal bolt portions 255, 265 to rotate within and relative to upper enlarged portion 220.

On the front face side 224 of the upper tool portion 220 are rotatable gear wheels 270, 280 each having outer serrated teeth edges 272, 282 which interconnect together so that while wheel 270 rotates clockwise in the direction of arrow D1, gear wheel 280 rotates counter-clockwise in the direction of arrow D2. Inside of both gear wheels 270, 280 are a raised wheel portions 274, 284 having smooth outer surface edges 276, 286, respectively. Through the center portion of gear wheels 270 are the outer hexagonal heads 258, 268 that are affixed to outer ends of rotatable pilot bolts 250, 260, respectively.

Figure 4A:
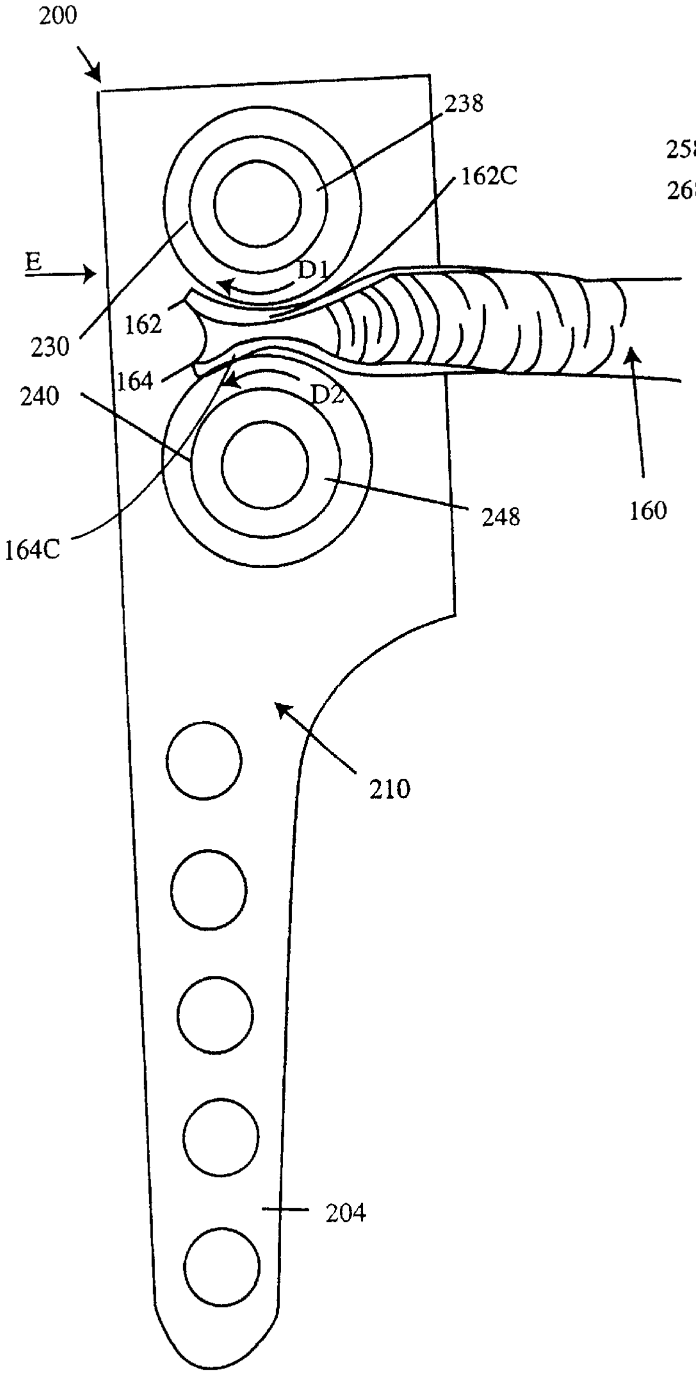
FIG. 4A is rear view of the tool of FIG. 3A with an insert material between the dual rollers.
Figure 4B:
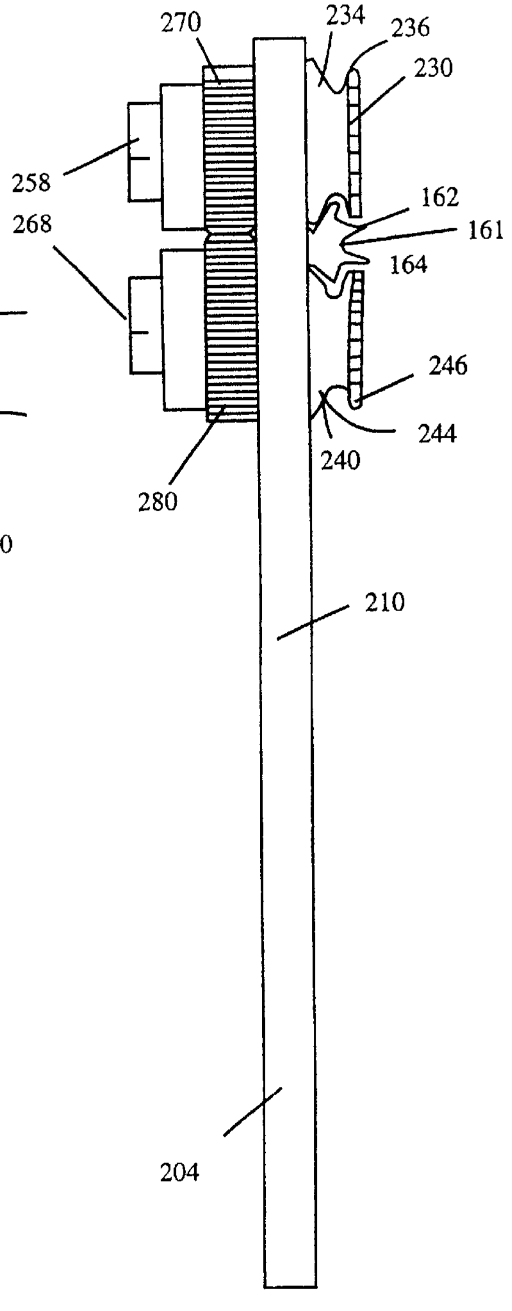
FIG. 4B is a side view of FIG. 3A along arrow E.

FIG. 4A is rear view of the tool 200 of FIG. 3A with the insert material 160(shown in detail in FIGS. 2A, 2C) between the dual rollers 230, 240. FIG. 4B is a side view of FIG. 3A along arrow E. Referring to FIGS. 4A–4B, upper angled backing edge 162 and a lower angled backing edge 164 are compressed towards one another into space 161 as the upper raised front edge 163 and lower raised front edge 165 are being compressed inward towards one another as the strip 160 passes between rotating rollers 230, 240. The grooved surfaces formed from inwardly sloping side portions 234, 244 and raised front lip knurled(serrated) edges 236, 246 which grasp the upper raised front edge 163 and lower raised front edge 165 of the strip 160, causing the strip to advance through the rollers 230, 240, when either the nut heads 258, 268 are being rotated.

Figure 5:
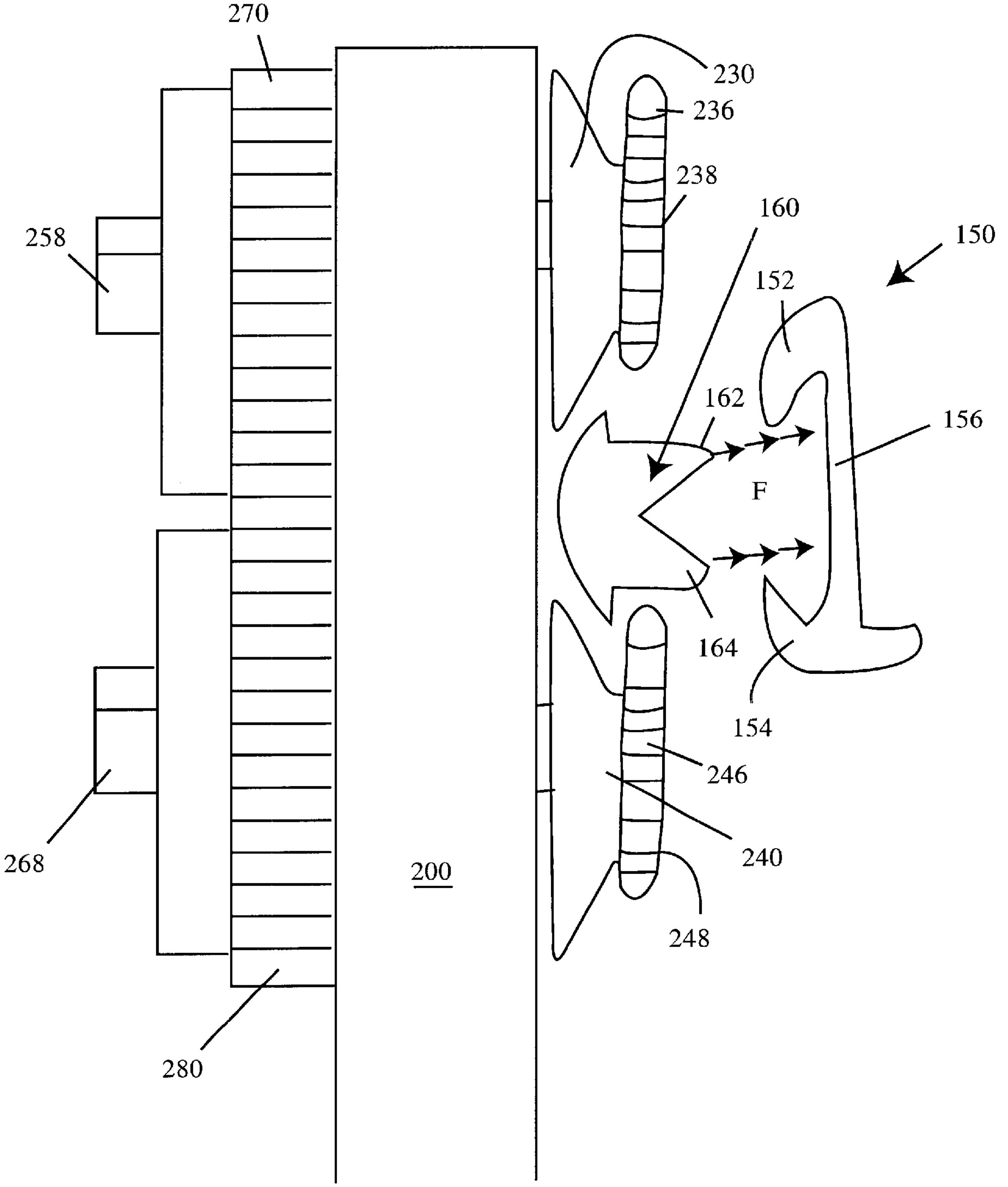
FIG. 5 is an enlarged side view of the tool of FIG. 4B initially inserting the insert material into the channel of a gunnel rail/rub rail.

FIG. 5 is an enlarged side view of the tool 200 of FIG. 4B where an installer holding tool 200 initially inserts the compressed upper angled backing edge 162 and lower angled backing edge 164 of material strip 160 in the direction of arrow F into the channel opening formed between inwardly bending upper lip portion 152 and inwardly bending lower lip portion 154 of gunnel rail/rub rail 150.

Figure 6A:
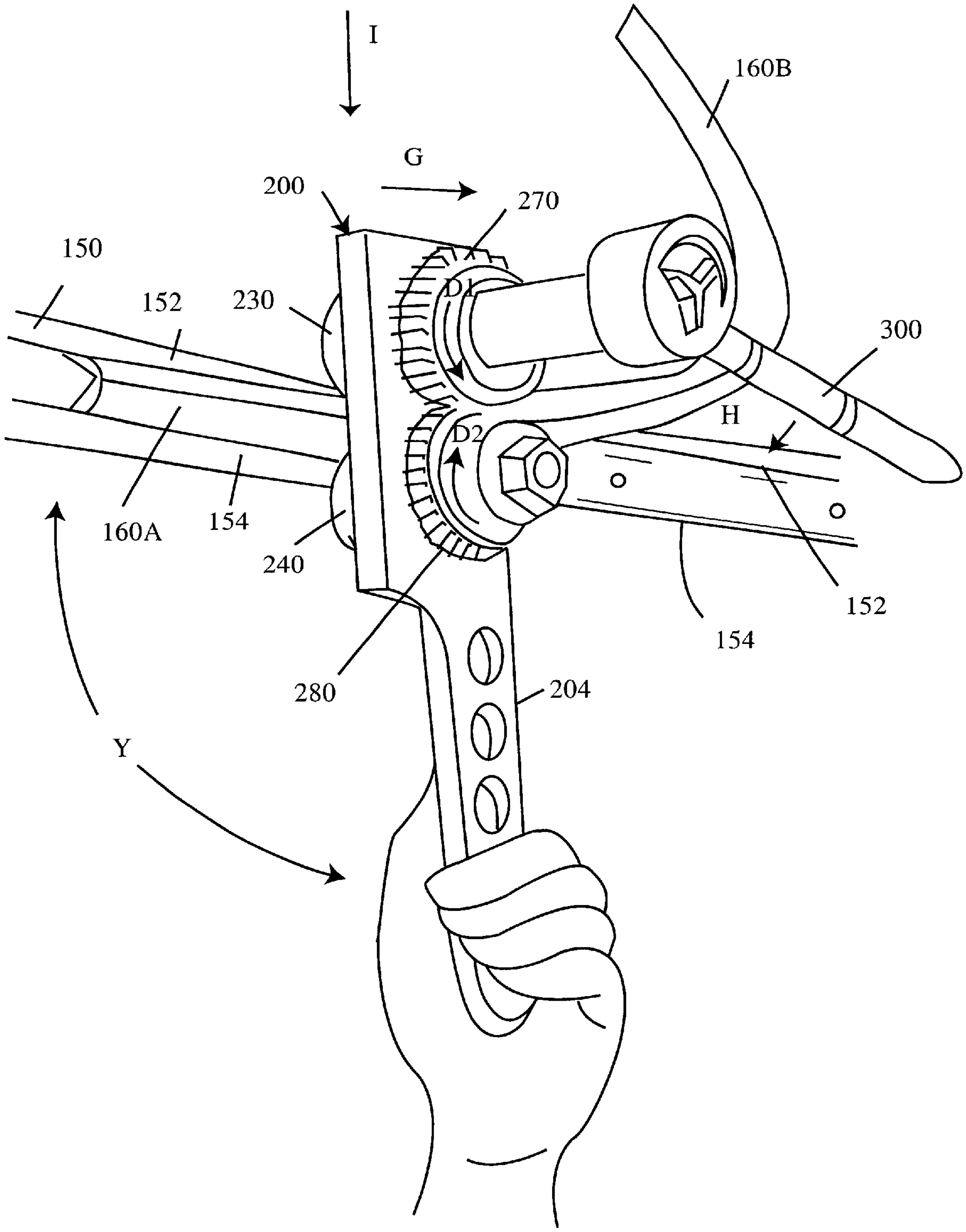
FIG. 6A is a perspective view of the tool of FIGS. 4A–4B and 5 being used to install the insert material into the channels of a gunnel rail/rub rail.
Figure 6B:
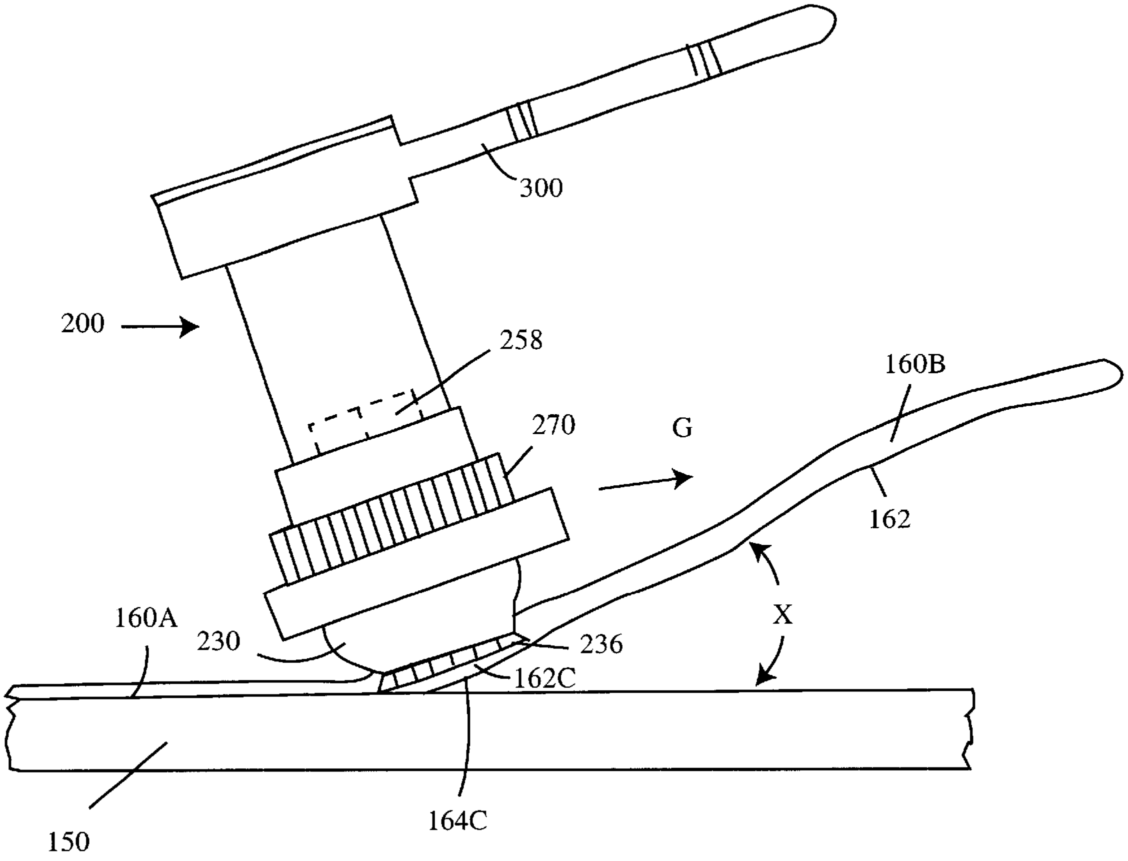
FIG. 6B is a side view of FIG. 6A along arrow I.

FIG. 6A is a perspective view of the tool 200 of FIGS. 4A–4B and 5 installing the insert material 160A, 160B into the channel opening formed between upper lip portion 152 and lower lip portion 154 of gunnel rail/rub rail 150. FIG. 6B is a side view of FIG. 6A along arrow I.

Referring to FIGS. 6A–6B, an installer uses one hand to hold the handgrip portion 204 of the tool 200 at an offset angle Y to gunnel rail/rub rail 150, such that edges of flat face portion 238, 248(shown in detail in reference to FIGS. 3A, 4A, 5) of roller wheels 230, 240 abut against outer surface edges of upper and lower lip portions 152, 154 of the gunnel rail/rub rail 150 at an angle X, of approximately 30 degrees to the gunnel rail/rub rail 150. An installer can use a second hand to rotate a ratchet wrench 300 that is attached to upper nut bead 258, which is rotated in the direction of arrow H while simultaneously sliding and edge of the roller wheels 230, 240 against the gunnel rail/rub rail 150 and moving the tool in the direction of arrow G at a tilt angle X, of approximately 30 degrees. The resilient insert material strip passes into the channel of the gunnel rail/rub rail 150 as indicated at 160A on the left side of tool 200 while loose insert material strip 160B hangs outside the right side of tool 200. After the tool 200 passes in the direction of arrow G over a section of the gunnel rail/rub rail 150, compressed portions 162C, 164C(also shown in FIG. 4A) of the upper and lower angled backing edges 162, 164 of the strip material 160 which expand as bulging portions into the inside lip portions 152, 154 of the gunnel rail/rub rail 150 locking the strip material 160 in place. An optional rubber mat can be adhered to the faces 238, 248 of the wheels 230, 240, to further protect the exterior surface of the gunnel rails/rub rails.

The tool 200 described above can be used to remove the strip material 160 from the gunnel rail/rub rail 150. For example, a user can insert a flat tool to pry up an edge of the strip material and reverse the operation described in reference to the preceding figures.

Figure 7:
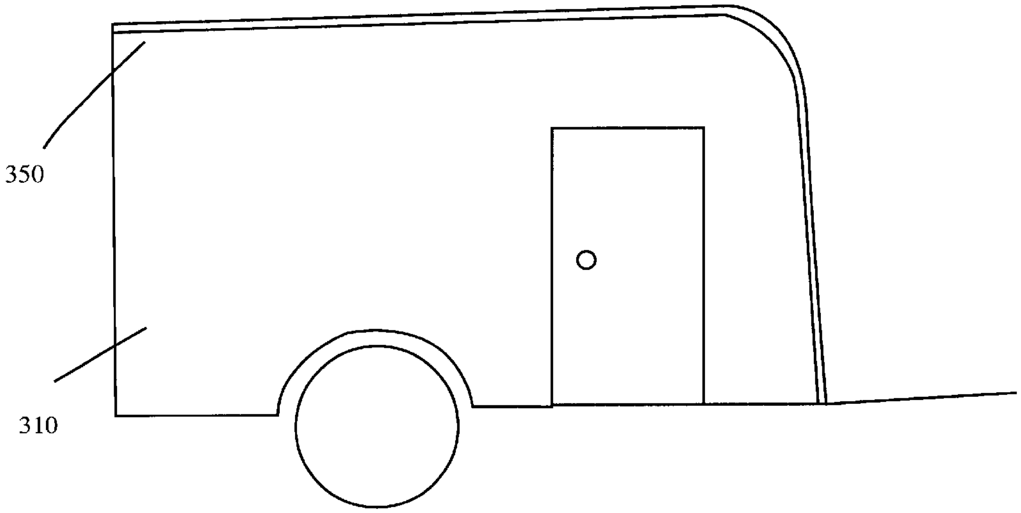
FIG. 7 is a side view of gunnel rails/rub rails on the sides of a trailer.
Figure 8:
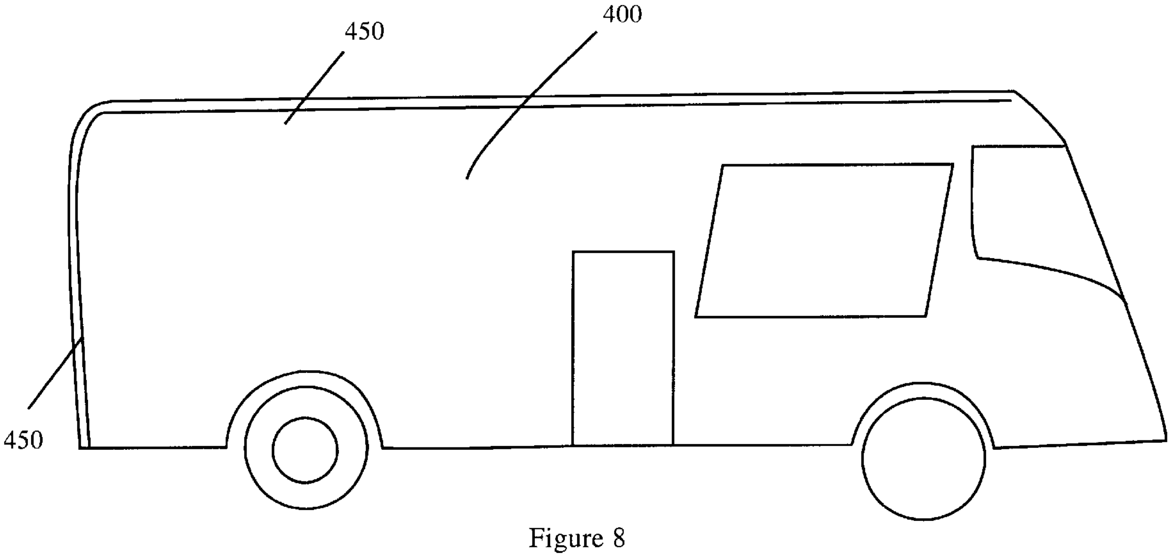
FIG. 8 is a side view of gunnel rails/rub rails on the sides of a motor home.

FIG. 7 is a side view of gunnel rails/rub rails 350 on the sides of a trailer 350 where the novel tool 200, of the preceding figures can be used to install the resilient insert material strips into the rails 350. FIG. 8 is a side view of gunnel rails/rub rails 450 on the sides of a motor home 400, where the novel tool 200 of the preceding figures can be used to install resilient insert material strips into the rails 450.

Figure 9:
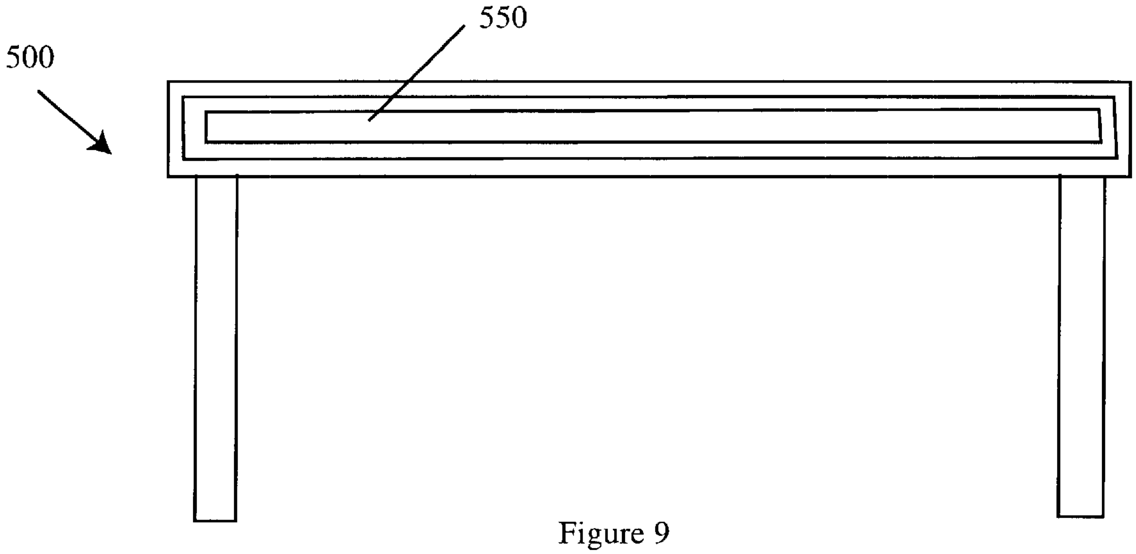
FIG. 9 is a side view of gunnel rails/rub rails on the side(s) of a table.
Figure 10:
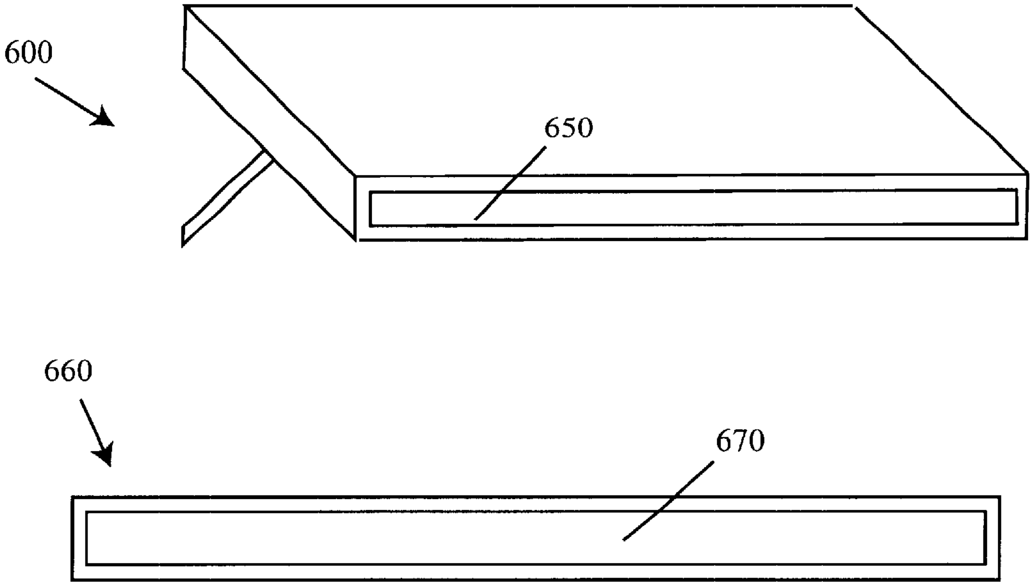
FIG. 10 is a side view of gunnel rails/rub rails on the side of a shelf and wall.

FIG. 9 is a side view of gunnel rails/rub rails 550 on the side(s) of a table 500. FIG. 10 is a side view of gunnel rails/rub rails 650, 670 on the sides of a shelf 600 and wall 660.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of installing and removing resilient bumpers into channels on gunnel rails and rub rails, comprising the steps of:

inserting an end portion of a resilient bumper strip into one end of a handheld tool;

compressing the end portion of the resilient bumper strip with the one end of the handheld tool to cause a bulge portion;

moving the one end of the handheld tool over a channel opening of a gunnel rail while abutting the one end of the handheld tool against the channel at a tilted angle of approximately 30 degrees; and positioning the bulge portion into the channel opening of the gunnel rail, wherein the handheld tool installs the resilient bumper strip within the gunnel rail.

2. The method of installing and removing resilient bumpers of claim 1, further comprising the steps of:

expanding a portion of the bulge portion within the channel.

3. A method of installing resilient bumpers into channels on gunnel rails and rub rails, comprising the steps of:

providing an elongated rail having an outer side with a channel along the outer side;

compressing edge portions of a resilient bumper strip into a side portion of a handheld tool to form a bulging portion;

positioning the handheld tool at a tilted angle to the elongated rail;

moving the handheld tool at the tilted angle along the elongated rail; and expanding the bulging portion of the resilient bumper strip from another side portion of the handheld tool into the channel on the elongated rail.

4. The method of claim 3, wherein the step of positioning includes the step of:

tilting the handheld tool at approximately 30 degrees to the elongated rail.

5. The method of claim 3, further comprising the steps of:

providing a grip handle for the handheld tool; and positioning the grip handle at an off axis orientation from the elongated rail while the handheld tool is moving at the tilted angle to the elongated rail.

6. The method of claim 5, wherein the positioning step further includes the step of:

positioning the grip handle in a downward direction while the elongated rail is horizontal.

7. The method of claim 1, further comprising the steps of:

providing a grip handle for the handheld tool; and positioning the grip handle at an off axis orientation from the elongated rail while the handheld tool is moving at the tilted angle to the elongated rail.

8. The method of claim 7, wherein the positioning step further includes the step of:

positioning the grip handle in a downward direction while the elongated rail is horizontal.

* * * * *